A. A. BACKHAUS.
PROCESS OF TREATING DISTILLERY WASTE.
APPLICATION FILED OCT. 22, 1917.
1,396,007.
Patented Nov. 8, 1921.
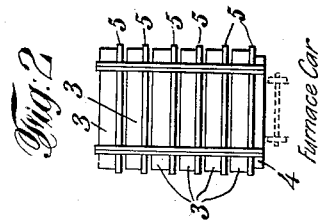
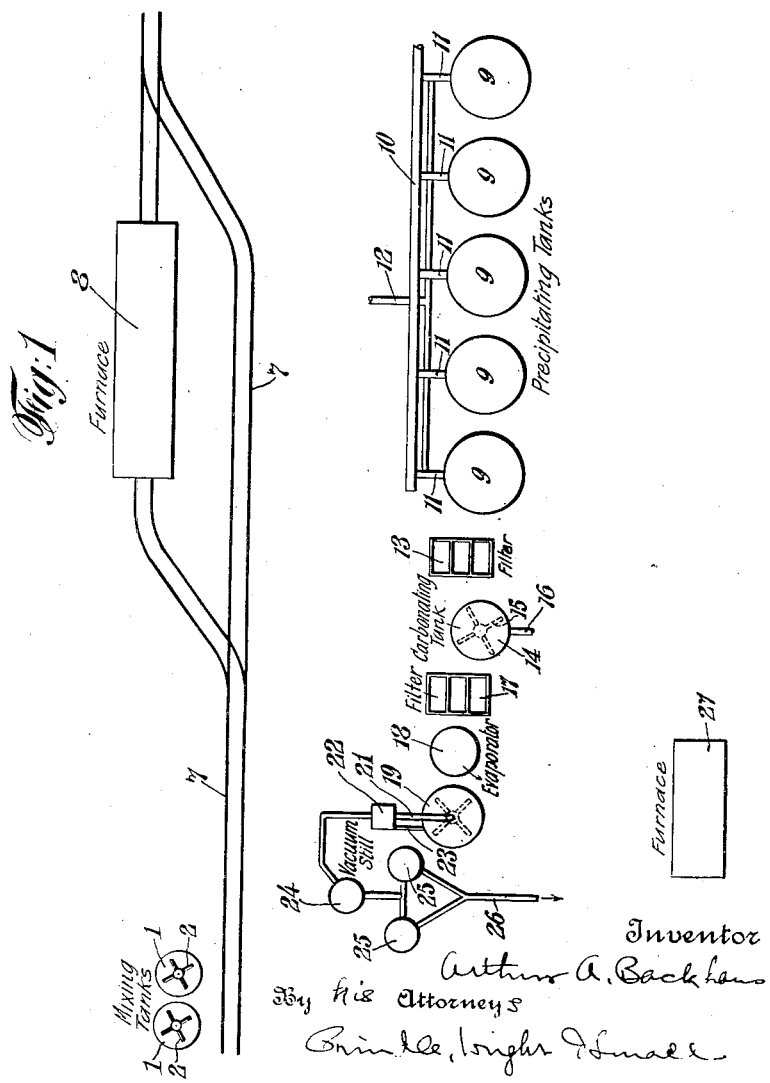

UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

PROCESS OF TREATING DISTILLERY WASTE.

1,396,007. Specification of Letters Patent. Patented Nov. 8, 1921.

Application filed October 22, 1917. Serial No. 197,884.

*To all whom it may concern:*

Be it known that I, ARTHUR A. BACKHAUS, of Baltimore, in the State of Maryland, have invented a certain new and useful Improvement in Processes of Treating Distillery Waste, and do hereby declare that the following is a full, clear, and exact description thereof.

My invention relates particularly to a process for treating the waste obtained from distilleries in the production of alcohol.

The object of my invention is particularly to utilize the waste obtained from the distillation of various materials used in the production of ethyl alcohol.

More particularly, the object of my invention is to make use of the waste materials obtained in the production of ethyl alcohol from molasses, which may, for example, be obtained in the manufacture of cane or beet sugar, or from potatoes, grain, such as wheat, rye, barley, corn, etc.

A further object of my invention is to provide a process of obtaining oxalic acid as well as volatile organic acids and the caustic alkali which is used in the process.

Another object is to recover the caustic alkali with the aid of the carbon dioxid produced in the fermentation of the materials prior to the distillation for obtaining the alcohol.

Further objects of my invention will appear from the detailed description thereof contained hereinafter.

While my invention is capable of being carried out in many different ways, for the purpose of illustration, I shall describe only one way of carrying out the same herein; and, while my invention is capable of being carried out in connection with many different types of apparatus, I shall describe only one type of apparatus which may be used in connection therewith in the accompanying drawings, in which—

Figure 1 is a diagrammatic representation of an apparatus which may be used in connection with my invention; and Fig. 2 is an end elevation of a type of car used in connection with the same.

While my invention is applicable to the treatment of distillery waste obtained from the distillation of molasses, grain or any other material used in the production of ethyl alcohol, I shall describe it particularly in connection with the treatment of molasses. The preparation of the molasses and its distillation for the production of alcohol may be carried out in the usual way. Briefly, the molasses may, for example, be mixed with water in the proportion of five thousand parts by volume of water and one thousand parts by volume of molasses, and then acidified by the addition of one part by weight of sulfuric acid of 66° Bé. Thereafter a quantity of yeast is added, and, after fermentation, the product is distilled. In the process of fermentation, the carbon dioxid produced is conveyed away for use in a later stage of the process hereinafter described. Thereafter the waste obtained from the still is concentrated to form a magma, having a density of approximately 25° Bé. or higher.

In the drawings, I have shown two preliminary mixing tanks 1, having a plurality of stirrer arms 2, adapted to be rotated in any suitable manner, said tanks 1 being provided for mixing caustic alkali with a quantity of the magma. From the mixing tanks 1, the material may be conveyed into a plurality of pans 3 on trucks 4, containing racks 5 to receive the same, which trucks may be arranged to run upon a track 7 into a furnace chamber 8. The material in the pans 3 becomes dried in this manner to form a "clinker." This clinker contains sodium oxalate, as well as sodium salts of a number of volatile acids, such as formic, acetic, butyric acids, etc. The clinker may be then removed from the pans and introduced into a plurality of wooden tanks 9. These tanks 9 may be supplied with a quantity of water, and the contents of said tanks are adapted to be heated by means of e. g., live steam fed into the same by means of a pipe 10, having branch pipes 11, leading into the same. Said steam pipes 11 may have a pipe 12 connected thereto to supply compressed air, in order to assist in the agitation of the materials contained in the tanks. A quantity of a precipitant such as lime is added sufficient to precipitate the oxalic acid as an oxalate. The liquids may be then transferred from the tanks 9 into a filter 13, which removes the precipitate of e. g., calcium oxalate. The filtrate contains the sodium salts of the volatile organic acids and the excess of alkali present in the clinker. The filtrate may be run from the filter 13 into a closed container 14, which may have an agitator 15 of any suitable character, and which may be provided with an inlet pipe 16 to conduct the carbon dioxid obtained from the fermentation above referred to into the liquid therein.

This treatment may be conducted at atmospheric pressure or at increased pressure, as for example, at two or three atmospheres. The operation works somewhat better and less time is required where increased pressure is employed.

This mentioned treatment with carbon dioxid converts substantially all the alkali into bicarbonate of soda, which is precipitated. The precipitate is removed by passing the liquid through a filter 17. The filtrate, containing the sodium salts of the volatile organic acids, may be now evaporated in any suitable evaporator 18 nearly to dryness. This material may be then transferred to a vacuum still 19 and treated with e. g., sulfuric acid in sufficient quantity to release the volatile organic acids. The still may be provided with a stirrer and a vapor outlet pipe 21, having a foam trap 22, connected by a return pipe 23 to the still 19. The pipe 21 may lead to a condenser 24, which may discharge into two receivers 25 adapted to be connected by a pipe 26 to a vacuum pump.

The calcium oxalate deposited in the filter 13 may be removed therefrom and treated to recover the oxalic acid in any desired manner, as by treatment with sulfuric acid.

The precipitate of sodium bicarbonate obtained in the filter 17 may be removed therefrom to a furnace 27, where it may be incinerated to burn off the organic matter and change the sodium bicarbonate into sodium carbonate. The sodium carbonate may be then treated by the addition of lime, so as to produce sodium hydroxid, which may be recovered from the calcium corbonate mixed therewith and used over again in the process.

As a specific example of my invention, I may proceed as follows: A quantity of the distillery waste or slop is evaporated in the usual way to form a magma having a density of 25° Bé. or higher. This magma may be mixed in the proportion of three parts by weight of magma to one part by weight of caustic soda in the tanks 2, until the alkali has become completely dissolved. If desired, the two tanks 2 may be operated alternately, so that, while one tank is being charged, the other is being discharged. The mixture thus obtained is preferably transferred to the pans 3 on the trucks 4 and is introduced into the furnace chamber 8, where the material may be subjected to a temperature of from 175° to 250° C. for 8 to 24 hours, the time of treatment being varied according to the temperature. Where the temperature is low, the treatment is for a longer period of time than where the temperature is higher.

When the reaction is complete, the treatment in the furnace chamber 8 is discontinued. The effect of the treatment in the furnace chamber 8 is principally to bring about the production of oxalic acid and volatile organic acids. The clinker thus obtained, which ordinarily contains a quantity of sodium oxalate amounting to approximately 10% of the weight of the clinker and a quantity of sodium salts of a number of volatile acids, such as formic, acetic, butyric acids, etc., amounting to from 12% to 20% of the weight of the clinker, is treated in about the proportions of one part by weight of clinker and two parts by weight of water, and a sufficient quantity of lime, or the like, is added to precipitate the oxalic acid as calcium oxalate. When lime is used the amount of lime added will usually be about 5% of the weight of the clinker introduced into the tanks 9. The oxalate and other solid materials present are then separated from the liquids by means of the filter 13.

The filtrate contains the sodium salts of the volatile organic acids and any excess of alkali that may be present. As mentioned the filtrate may be then run from the filter 13 into the closed container 14, which may be provided with the inlet pipe 16 to conduct the carbon dioxid obtained from the fermentation above referred to into the liquid therein.

This treatment may be conducted at atmospheric pressure or at increased pressure, as for example, at two or three atmospheres. The operation works somewhat better and less time is required where increased pressure is employed.

This converts all the alkali into bicarbonate of soda, which is precipitated. The precipitate produced by carbon dioxid preferably under pressure may be removed by passing the liquid through the filter 17 and the filtrate, containing the sodium salts of the volatile organic acids, preferably after being evaporated in an evaporator 18 nearly to dryness, may be transferred, as mentioned, to the vacuum still 19 and treated therein with an acid, such as sulfuric acid, preferably in the proportion of three parts by weight of solid and one part by weight of sulfuric acid of 66° Bé. This releases the volatile organic acids from their salts, which may be collected in receiving vessels.

As mentioned, the calcium oxalate deposited in the filter 13 may be removed therefrom and treated to recover the oxalic acid in any desired manner, as by treatment with sulfuric acid, and the precipitate of sodium bicarbonate obtained in the filter 17 may be removed therefrom to the furnace 27, where it may be incinerated to burn off the organic matter and change the bicarbonate into sodium carbonate. The sodium carbonate may be then treated by the addition of lime, or the like, in the proportion of about two parts of sodium carbonate and one part of lime, so as to produce sodium hydroxid, which may be separated from the calcium carbonate mixed therewith by filtration and used over again in the process.

While I have described my invention above in detail, I wish it to be understood that many changes may be made therein without departing from the spirit of my invention. For example, instead of calcium compounds, I may use salts of the other alkaline earth metals, and I wish this to be understood wherever I have referred to use of calcium compounds, and instead of caustic soda, I may use other alkalis or carbonates of the alkali metals or mixtures of the same.

I claim:

1. The process of treating distillery waste comprising heating with caustic alkali at a temperature of about 175 to 250 degrees C. for a few hours, dissolving the product in water and precipitating the oxalates as calcium oxalate, filtering off the latter, separating the alkali from the filtrate, distilling the remainder with a non-volatile acid to recover the organic acids.

2. The process of treating distillery waste comprising heating with caustic alkali at a temperature of about 175 to 250 degrees C. for several hours, dissolving the product with water and precipitating the oxalates with lime, filtering off the latter, precipitating the alkali as sodium bicaronate by means of carbon dioxid, evaporating the remainder and distilling with sulfuric acid to recover the organic acids.

3. The process of treating distillery waste comprising heating a concentrated magma with caustic alkali in the proportions of 3 parts magma and 1 part alkali, at a temperature of about 175 to 250 degrees C. for several hours, dissolving the product in water, precipitating with lime to bring down the calcium oxalates, filtering off the latter, separating the alkali from the filtrate, distilling the remainder with sulfuric acid to recover the volatile organic acids.

4. The process of treating distillery waste comprising heating it with caustic alkali at a temperature of from 175 to 250 degrees C. for several hours, dissolving the product in water and precipitating the oxalates as calcium oxalate, filtering off the latter, separating the alkali from the filtrate, evaporating the remainder and distilling with sulfuric acid to recover the volatile organic acids.

5. The process of treating distillery waste comprising heating the concentrated magma with caustic alkali in the proportions of 3 parts magma and 1 part alkali, at a temperature of about 175 to 250 degrees C. for several hours, dissolving the product in water and precipitating the oxalates as calcium oxalate, filtering off the latter, separating the alkali as sodium bicarbonate from the filtrate, evaporating the remainder and distilling with sulfuric acid to recover the volatile organic acids.

In testimony that I claim the foregoing I have hereunto set my hand.

ARTHUR A. BACKHAUS.

Witnesses:
CARL HANER, JR.,
DEZSO E. KELEN.